United States Patent

Rostoker et al.

[11] Patent Number: 6,035,212
[45] Date of Patent: Mar. 7, 2000

[54] MULTI-FREQUENCY WIRELESS COMMUNICATION DEVICE

[75] Inventors: Michael D. Rostoker, Boulder Creek; John Daane, Saratoga; Sandeep Jaggi, San Jose, all of Calif.

[73] Assignee: LSI Logic Corporation, Milpitas, Calif.

[21] Appl. No.: 08/691,554

[22] Filed: Aug. 2, 1996

[51] Int. Cl.[7] .................................................... H04B 1/08
[52] U.S. Cl. ......................... 455/552; 455/553; 455/575; 455/351; 455/434
[58] Field of Search ............................. 455/422, 462.62, 455/517, 550, 552, 553, 575, 351, 434

[56] References Cited

U.S. PATENT DOCUMENTS

| | | | |
|---|---|---|---|
| 5,127,042 | 6/1992 | Gillig et al. | 455/552 |
| 5,210,785 | 5/1993 | Sato et al. | 455/552 |
| 5,493,693 | 2/1996 | Tanaka et al. | 455/553 X |
| 5,732,348 | 3/1998 | Norimatsu | 455/552 X |

*Primary Examiner*—Edward F. Urban
*Assistant Examiner*—Philip J. Sobutka

[57] ABSTRACT

A wireless communication device may take the form of a cellular telephone, of a portable personal communication device, or even of a desk top personal computer which is equipped to communicate over the wireless cellular communication system in effect in a particular area. The wireless communication device is configured to self-adapt to various operating frequencies and communication protocols which may be present in the cellular communication environment so that the device is able to provide communications in several service areas even though the frequencies of operation and the communication protocols in use in the service areas may be incompatible with one another.

4 Claims, 5 Drawing Sheets

MULTI-FREQUENCY WIRELESS COMMUNICATION DEVICE

CROSS REFERENCE TO RELATED APPLICATION

The present invention is related to subject matter disclosed in pending U.S. patent application Ser. No. 08/580,797, filed Dec. 29, 1995; the subject matter of which is hereby specifically incorporated herein by reference to the extent necessary for a full enabling disclosure of the present invention.

BACKGROUND OF THE INVENTION

The present invention relates to wireless voice communication. More particularly, the present invention relates to radio frequency (RF) communication (both reception and transmission) of audio signals in both analog and digital form, and according to selected communication frequency standards and protocols applying to cellular communication systems in particular geographic areas.

RELATED TECHNOLOGY

Presently, new forms of wireless communication equipment are allowing far-reaching changes in the way people conduct their lives, on all of the personal, business, and professional levels. Additional and more far-reaching changes of this kind are on the near horizon. For example, remotely-accessible voice, video, and data communication systems may allow communication with others, with computers and with data systems to become more available. These communications will be available regardless of a person's location in the world. Thus, these changes will put us all on the verge of an unlimited amount of information available anywhere, anytime, and without the necessity to travel to an office or other formalized site for such activities.

Hereinafter, it will be understood that the word, "information" is used in a generic sense to encompass any one or all of digital audio, digital music, digital video, digital data, ASCII, and mixed-digital forms of communication signals.

Wireless data communication capabilities are already improving the productivity and accessibility of professionals who are away from their office or home. The ability to send and receive information over airwaves instead of copper wires is liberating the professionals from their offices, giving them immediate access to databases and streamlining many aspects of their professional and personal activities. Already, notebook computers are equipped with advanced wireless communications software and radio-frequency modems have enabled the utilization of "virtual" offices which are remote from the physical facilities of a company headquarters or business. Now, a market analyst, for example, can track the stock market in his car while sitting in traffic during her commute to work. An engineer, instead of sitting in her office, can work on a CAD/CAM file from pool-side at home. Cellular telephone services today allow convenient mobile voice communication without the encumbrances of hard-wired connections.

Presently cellular telephone systems are extensively available in large urban areas of the industrialized countries, and are becoming more available throughout the world. However, as will be seen, the cellular service system is not seamless. In fact, a world traveler today would have to buy a number of cell-phones or portable communication devices in order to enjoy portable communication where ever the person might travel.

Particularly, the United States presently uses two forms of cellular telephone communication. One form is analog cellular telephone communication, which is available throughout the country. This universal availability of analog cellular communication systems resulted because at the inception of the cellular telephone industry, the analog cellular system was the only system available, and was installed everywhere that such service was made available. Consequently, a U.S. user of an analog cellular telephone may take it along anywhere in the United States, and provided that this user has an account with his home service company authorizing use of the phone outside of its primary service area (i.e., allowing identification of the user to a remote cellular telephone system, and back-charging of service fees), then the user can "roam". The analog cellular telephone will successfully interface with the analog cellular telephone system wherever the user may happen to be in the United States. In the U.S., the analog cellular telephones and telephone systems operate on a frequency of 900 MHz. Analog systems are limited to transmitting audio communication signals at a rate of 64 Kbps.

However, the owner of a digital cellular telephone does not enjoy the same ability to roam with his telephone. This is the case because the digital cellular telephones and telephone systems operate using differing protocols for compressing and encoding of the audio communication signals of voice communications into and from digital form. The current communication protocols are referred to as GSM, CDMA (also known as IS-95), and TDMA. Time Division Multiple Access ("TDMA") and Code Division Multiple Access ("CDMA") techniques allow for multiple users to access a single bandwidth, thus making better use of scarce airwave space (i.e., the number of available frequencies is limited). Those ordinarily skilled in the pertinent arts will know that within a cell site of a cellular telephone system, each frequency bandwidth is "shared" by all subscriber units, either through a Time Division Multiple Access ("TDMA") technique, or through a Code Division Multiple Access ("CDMA") technique.

The TDMA technique divides up the total available bandwidth into a predetermined number of time slots, with each subscriber unit being allocated a specific time slot. One of the time slots contains an imbedded control channel. Each base station continuously transmits time division multiplexed bit streams to the subscriber units on the downlink frequency, with each subscriber unit responding by transmitting bursts of information on the uplink frequency within the respective time slots assigned to the particular subscriber units. Even if a base station is not communicating with a subscriber unit, a dummy time slot transmission is sent.

The CDMA technique, instead of dividing up the total bandwidth into time slots, spreads the signal of each subscriber unit across the entire bandwidth. Although each subscriber unit generally occupies the entire bandwidth designated by the base station, it utilizes only a portion of the power available to the base station. The information-bearing signal is multiplied by a high bandwidth, high frequency digital spreading signal, which expands the narrow bandwidth information-bearing signal into a broad spread-signal covering the entire transmission bandwidth. The spreading signal uses quasi-orthogonal bit sequences of period Tc, referred to in the art as chips. The chip sequence causes the cross-correlation function between subscriber units to be small, such that the subscriber units are quasi-orthogonal to each other. The chip sequence can be generated or chosen so that a predetermined or unique chip sequence is assigned to a specific subscriber unit each time the subscriber unit starts or answers a call. This, of course, requires the network controller to maintain a central log or listing of all user chip sequence assignments.

Digital and mixed-signal wireless communication systems offer many advantages over old-fashioned analog systems. One important advantage is the ability of digital systems to transmit and receive more information at higher rates. Whereas analog systems are limited to transmitting audio at a rate of 64 Kbps, digital systems can compress audio transmissions and transmit eight times as much information at the same rate. Moreover, faster processors have allowed digital systems to transmit bits at ever increasing rates. By taking advantage of the ability to transmit information more accurately and at higher rates, significant savings have been realized in both switching capacity and ongoing line costs.

A recent development in the wireless information revolution has been the transmission of digital video signals over the airwaves. This is now being done in the television industry, as near-perfect images are being transmitted digitally on the Ku-band from satellites to home-mounted dishes as small as eighteen inches in diameter. A similar development is occurring in the cellular telephone industry as efforts are being made to add video capability to cellular telephones.

However, before quality video capability can be added to cellular telephones, a problem arising from bandwidth limitation must be overcome. Most current cellular telephone systems operate on a frequency of 900 MHZ (800 MHz in Europe or some other parts of the world). Yet even with the use of sophisticated compression routines, the bandwidth is not wide enough to transmit the enormous amount of video and audio information that is required for quality motion pictures. Bandwidth limitation may not be a problem for high frequency satellite transmissions, but it is a problem for the comparatively low frequency radio transmissions.

Hereinafter, it will be recognized that reference to a "telephone," or a "cell-phone," is intended as a reference to a cellular telephone and/or cellular telephone system. This reference can also encompass a variety of other devices which are inter-operable with a wireless cellular telephone system. For example, a "telephone" as used hereinafter, may include (without limitation, and as example only), a PC equipped to operate with a cellular telephone system, a lap-top or palm-top computer equipped with an internal wireless (i.e., radio) modem to operate in cooperation with cellular telephone systems, and other portable or fixed-location devices inter-operating with a cellular telephone system. With respect to fixed-location devices such as home PC's and base stations, it is recognized that these devices are movable and may be taken from one cell-phone service area to another on occasion. Thus, these devices are in fact portable and it is desirable to have them inter-operate with various types of cell-phone systems.

However, the result of the differences in digital cellular telephone system protocols discussed above is that users of digital cell-phones are limited to use of their phone in their own subscriber area, and possibly in those other subscriber areas having the same protocol in use. When the subscriber travels to a cell-phone service area having a different digital protocol in effect, the cell-phone is not usable because of the incompatible protocols of the system and the telephone.

Additionally, current U.S. analog cellular telephone systems operate on a frequency of 900 MHz, while systems of some other countries operate on 800 MHz. For example, many countries in Europe may adopt the GSM 800 MHz standard, while the United States uses the GSM 900 MHz standard, along with the CDMA standard at the same frequency. Thus, the user of an analog cellular telephone in the United States cannot take this same phone to Europe and have it operate because the system frequencies are incompatible. The same is true of a European user of an analog cell-phone who travels to the United States.

Another aspect of system and telephone incompatibility arises because some systems make GSM available at a higher frequency band as well. In the United States, this higher frequency band is at 1900 MHz, while in Europe it is at 1800 MHz. One of the CDMA or TDMA protocols is (or soon will be) available at the higher frequency band as well.

Thus, a result of the differences in digital cellular telephone system operating frequencies is that users of digital cell-phones are limited to use of their phone in their own subscriber area, and possibly in those other subscriber areas having the same frequency in use. When the subscriber travels to a cell-phone service area having a different operating frequency in effect, the cell-phone is not usable because of the incompatible frequencies of the system and the telephone.

Therefore, it is desirable to provide a cell-phone which is not fully subject to the above-mentioned operating frequency incompatibility problem; and is thus able to provide a wireless communication device which self-adapts to prevailing frequencies in cell-phone service areas, and which will operate in at least two service areas differing from one another in this respect.

Additionally, it is desirable to provide a cell-phone which overcomes the above-mentioned operating protocol limitation problem. Such a cell-phone would provide a digital wireless communication device which self-adapts to at least two communication protocols as may be adopted in two service areas. Thus, when the equipment is transported between the two service areas it continues to be operable in each one, and in both of these service areas the change in equipment operation is transparent or not noticeable to the user.

Further, it is desirable to provide a cellular telephone which combines the multi-frequency and multi-protocol features mentioned above into a single cell-phone device which is operable virtually world-wide with existing and future cell-phone systems.

Still further, it is desirable to provide an optimized architecture for an integrated circuit chip or chip-set usable in such a cell-phone to implement the features of the present invention.

SUMMARY OF THE INVENTION

In view of the limitations of the conventional technology as outlined above, a primary object for this invention is to avoid one or more of these limitations.

An additional object for this invention is to provide a wireless communication device which is self-adaptable to at least two differing frequency bandwidth standards as may be adopted in the locations to which the equipment is transported.

Yet another object for this invention is to provide a wireless communication device which is self-adapting to at least two operating protocol standards which may be adopted in locations to which the equipment may be transported.

An object for this invention is to provide a wireless communication device which is self-adapting to whatever combination of frequency and protocol standard is adopted in the location to which the equipment is transported.

Still another object for this invention is to provide a wireless communication device which is self-adapting to certain frequency and/or protocol standards which may be adopted in locations to which the equipment may be transported, and which performs this self-adaptation transparently to the user (i.e., with no intervention or adjustment by the user being required, and preferably with the user not noticing the adaptation of the equipment to its service area).

Again, a communication device embodying the present invention may take the form of a portable subscriber unit, such as a cellular telephone, or a portable personal communication Device (PPCD) which allows voice communication. The device can include a single chip, a multi-chip assembly (i.e., a multi-chip module, for example), or a board-level device (i.e., a board-configuration of circuit for insertion into a board slot of a personal computer).

Accordingly, the present invention provides a wireless communication device for allowing two-way voice communication in a cellular telephone communication system having an operating frequency band, the device comprising: operator voice input and audio output facilities, respectively allowing an operator of the device to input voice communications and to hear voice communications from the cellular telephone communication system; a radio frequency (RF) transceiver portion for sending and receiving RF signals carrying the two-way voice communications in the cellular communication system; the RF transceiver portion having a first RF transceiver part having a respective first operating frequency band, and a second RF transceiver part having a respective second operating frequency band which is different than the first operating frequency band, one of the first and second operating frequency bands being compatible with the operating frequency band of the cellular communication system; and a micro-controller interfacing with the RF transceiver portion of the device to detect when a signal is received from the cellular communication system in response to activation of one of the first and second RF transceiver parts, whereby the micro-controller thereafter maintains activation of the one transceiver part to adapt the wireless communication device for voice communication in the cellular telephone communication system.

According to another aspect, the present invention provides a wireless communication device generally as described above and wherein the cellular communication system provides communication in a particular protocol, the device further including an adaptation tree circuit conveying communication signals in the device between the RF transceiver portion and the operator voice input and audio output facilities, the adaptation tree circuit including at least two adaptation branches a first of which is adapted to process communication signals of a first protocol, and a second of which is adapted to process communication signals of a second protocol, the micro-controller interfacing also with the adaptation branches to detect when a communication signal is received from the cellular communication system and processed according to one of the first and second protocols in response to activation of one of the adaptation branches, whereby the micro-controller thereafter maintains activation of the one adaptation branch to adapt the wireless communication device for voice communication in the cellular telephone communication system.

Additional objects and advantages of the present invention will be apparent from a reading of the following detailed description of two alternative preferred exemplary embodiments of the present invention, taken in conjunction with the appended drawing Figures, in which like reference numerals designate the same feature or features which are analogous in structure or function.

DETAILED DESCRIPTION OF PREFERRED EXEMPLARY EMBODIMENTS OF THE INVENTION

Figure 1:
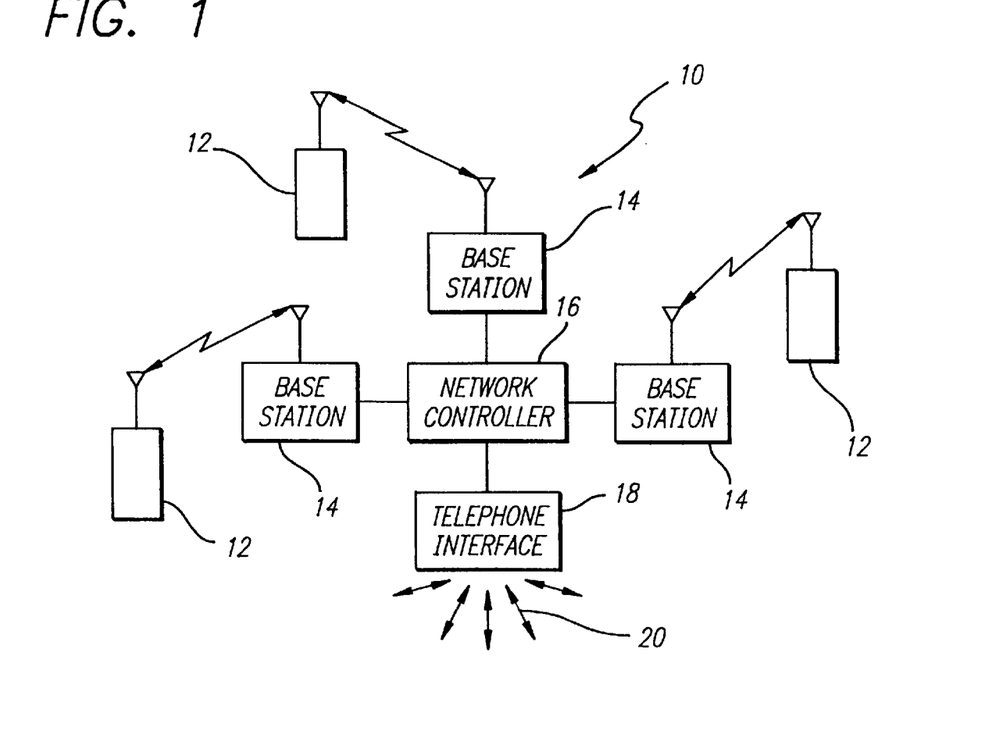
FIG. 1 is a schematic illustration of a typical cellular telephone wireless communication system.

FIG. 1 schematically depicts a typical cellular communication system 10. In this case, the system 10 is depicted to include three subscriber units 12 (which may be portable cell-phones, PPCD's, or PC's equipped to communicate over the cellular communication system depicted, for example), and three base stations 14. However, it will be understood that the system 10 is merely exemplary and for purposes of illustrating by example the principles of the invention, and is not to be misconstrued as implying a limitation on the invention. A real cellular communication system may include a large number of base stations, and a great number of subscriber units which are accessing or participating in the system at any one time. An alternative configuration of the invention may take the form of a private wireless communication system, such as would be used within the considerable confines of a large office building complex or manufacturing facility. The schematic representation of such a private wireless communication system would appear much the same as FIG. 1.

Again, the subscriber units 12 can include mobile units such as hand-held portable telephones (i.e., the now-familiar cellular telephones), stationary units (such as desk top computers), and portable personal communication devices (PPCD's—such as palm-top computers equipped with radio-frequency modems and/or radio frequency facsimile devices). The system 10 also includes a number of base stations 14 that allow the subscriber units 12 to communicate with each other and with other communication devices in other networks.

As is well understood by those ordinarily skilled in the cellular communication art, the system 10 covers a geographic area that is effectively divided into a grid or array of cell sites, with each cell site containing at least one base station 14. Each base station 14 communicates with all subscriber units 12 within the area of its respective cell site via radio frequency ("RF") signals. One frequency is used for transmission from the base station 14 to the subscriber units 12 (the "downlink" frequency), and a different frequency is used for transmission from the subscriber units 12 to the base station 14 (the "uplink" frequency). The system 10 employs "frequency reuse" to allow more than one base station 14 to operate at the same radio frequency. Each cell site is made large enough in area so that RF signals originating in one cell site and crossing into an adjoining cell site are sufficiently attenuated by distance so that they are perceived as lower level background noise by base stations in the adjacent and more distant cell sites. Frequency isolation occurs between adjacent cell sites by assigning these cells differing frequency band widths for their operations. Also, as pointed out above, RF signals are inherently attenuated in proportion to the square of the distance from the radiating source. Thus, same-frequency signals from a distant cell are perceived merely as noise within a particular cell operating on that frequency. Isolation may also be furthered by interference arising from man-made structures and natural topological features.

One or more frequency bands are set aside for setting up a communication link or call between the base station 14 and a subscriber unit 12. Effectively, the system 10 provides a cellular communications environment within its service area for the subscribers using subscriber units 12.

The base stations 14 are interlinked with a network controller 16 via a distribution facility such as a dedicated copper wire or fiber optic network, a radio communication link, or a satellite link. The network controller 16, in turn, provides access to existing communication networks 18. In FIG. 1, the existing communication network 18 is depicted singularly as a telephone interface, but it will be understood that this is merely exemplary. The interface 18 is multifaceted (as is schematically indicated by the spray of double-ended arrows 20) and may provide communication with a variety of other analog and/or digital communication facilities and networks, such as computer data bases, the World Wide Web, satellite links, television satellite communication channels, LAN's, WAN's, main-frames, work-stations, personal computer systems, and other communication facilities.

During operation of the communication system 10 with a mobile subscriber unit 12 (which is possibly moving from one cell site to another) each base station 14 determines the received signal strength of each call in progress, and forwards this information to the network controller 16. The network controller 16 uses advanced processing technology to keep track of all calls between the subscriber units 12 and base stations 14. As the subscriber unit 12 moves within the cellular communication environment provided by system 10, the network controller 16 also uses the signal strength information received at each base station 14 from the particular subscriber units 12 to determine when a call should be "handed off" from a base station in one cell site to the base station in another cell site. Such hand-off of mobile subscriber units as they move from one cell site to the next allows communication to be maintained with a subscriber unit 12 as the subscriber unit 12 moves from cell site to cell site within the environment system 10. As is easily understood, some subscriber units 12 may be stationary, so that hand-off of communications with these subscriber units is not necessary.

Figure 2:
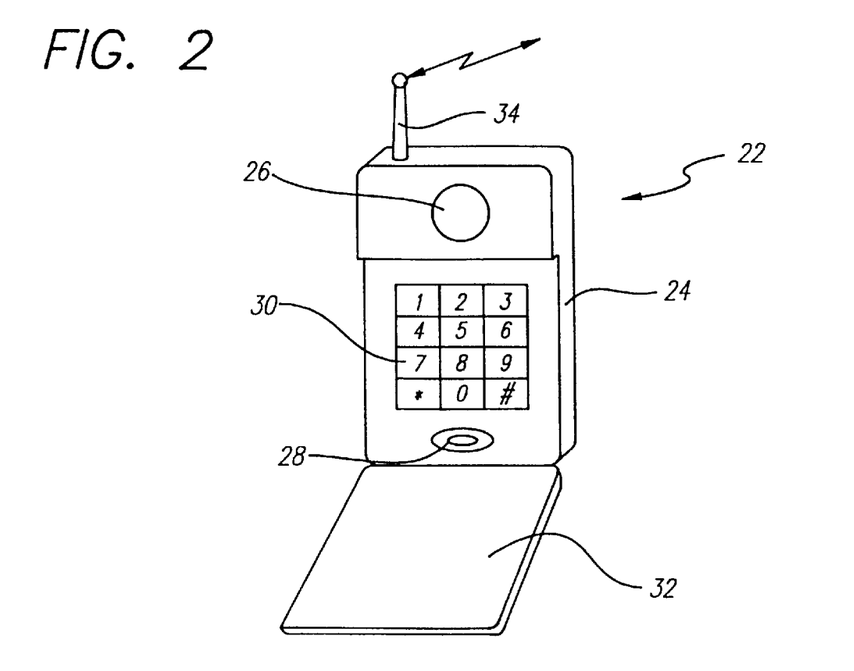
FIG. 2 is a pictorial representation of one embodiment of the present invention in the form of a cellular telephone.

FIG. 2 depicts a cellular communication device 22 embodying the present invention. The device 22 may take the form of an externally-typical cellular telephone. Because the cellular telephone externally appears to be the same as conventional cellular telephones, a detailed presentation of its operational features is not necessary. In brief, the cellular telephone 22 includes a body 24 housing a battery (not shown) allowing mobile operations, and having a speaker 26, a microphone 28, and a keypad 30. A pivotal cover portion 32 covers the microphone 28 and keypad 30 in its closed position (not shown) and functions as the switch hook for the cell-phone 22. A telescopic antenna 34 provides for transmission and reception of radio frequency signals.

However, in contrast to conventional cellular telephones, the cellular telephone 22 is self-adapting to various frequency bands and communication protocols which may be encountered in use. In many respects then, the cellular telephone 22 is not merely a U.S. cell-phone, or a European cell-phone, or a cell phone with a limited service area, as is the case with conventional cellular telephones. Instead, the cell-phone 22 embodying the present invention may be considered a world cell-phone because it will function where ever the user of the device may choose to provide for a service agreement with local service providers. Understandably, this service provision agreement may be a single umbrella agreement encompassing several service areas; or may consist of many agreements, one in each of the various areas where a user of the cell phone wishes to travel and enjoy cell-phone use. The same is true if the device 22 is implemented in the form of a PPCD or as a PC, for example.

Figure 3:
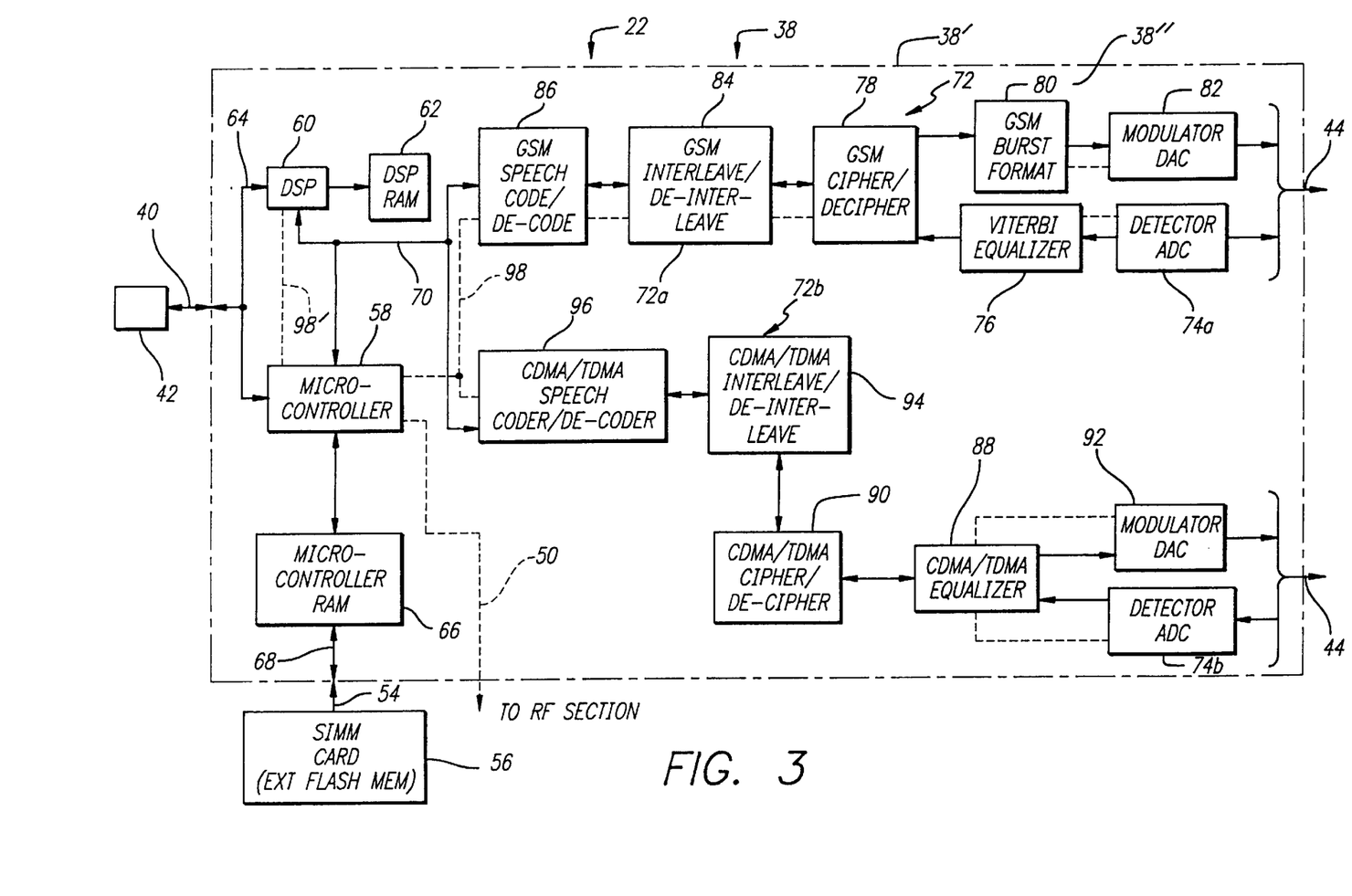
FIG. 3 provides a schematic functional block diagram of a portion of a wireless communication device embodying the present invention.

Turning to FIG. 3, a schematic diagram of a wireless cellular communication device 36 is presented. This device 36 may take the form of the cellular telephone 22 seen in FIG. 2, or may take the form of any one of the other wireless communication devices discussed above. For example, the device 36 may be implemented as a subscriber unit 12 or base station 14 of the cellular system discussed in connection with FIG. 1. Alternatively, the device 36 can be implemented as part of a wireless personal communication device, like a palm-top computer with an radio frequency fax/modem, for example, and which also provides audio cellular telephone communications. Such a communication device can also be implemented as part of a personal computer for stationary uses, if desired.

In contrast to conventional cellular communication devices, the device 36 is frequency agile, and is able to adapt itself to operate in varying cellular communication system environments, as well as in cellular systems having differing communication protocols. As will be seen, this facility is of most immediate advantage with mobile equipment such as portable cell-phones and personal communication devices. However, less mobile equipment such as PC's with wireless fax/modems, can also benefit because they can interface with local cellular communication systems wherever the purchaser of such a PC takes the computer, and without modification of the computer being required. In fact, as will be seen, the user of the computer, portable personal communication device, or portable cell-phone need not even be aware that the various geographic areas to which the user travels have differing cellular telephone frequency bands and differing communication protocols. The computer, cell-phone, or personal communication device implementing the invention will simply self-adapt to the local cellular communication system operating environment, and will provide communication with the user not detecting any external change in the device.

Viewing FIG. 3, it is seen that the device 36 includes a single integrated circuit chip 38, the encompassing boundary of which is delineated by a dashed line 38', and the semiconductor substrate of which is indicated with the numeral 38". While it is preferable that the structures and functions described below for chip 38 be located on a single integrated circuit chip, those ordinarily skilled in the pertinent arts will recognize that selected parts of the structure (and the associated functions) may be located on a second or additional integrated circuit chips. Accordingly, it will be recognized that the structures and functions depicted and described for circuit 38 may be located alternatively on a chip set rather than on a single integrated circuit chip. The chip 38 provides a two-way interface (indicated by double-ended arrow 40) with external physical interface devices (indicated with block 42). As will easily be understood in view of the description above of cell-phone 22, these external physical interface devices may include a speaker 26, a microphone 28, and a keypad 30. Alternatively, the interface devices may include an interface with a fax/modem device (not shown), or with a personal computer data register or memory device (also not shown) allowing communication of digital data files.

Figure 4:
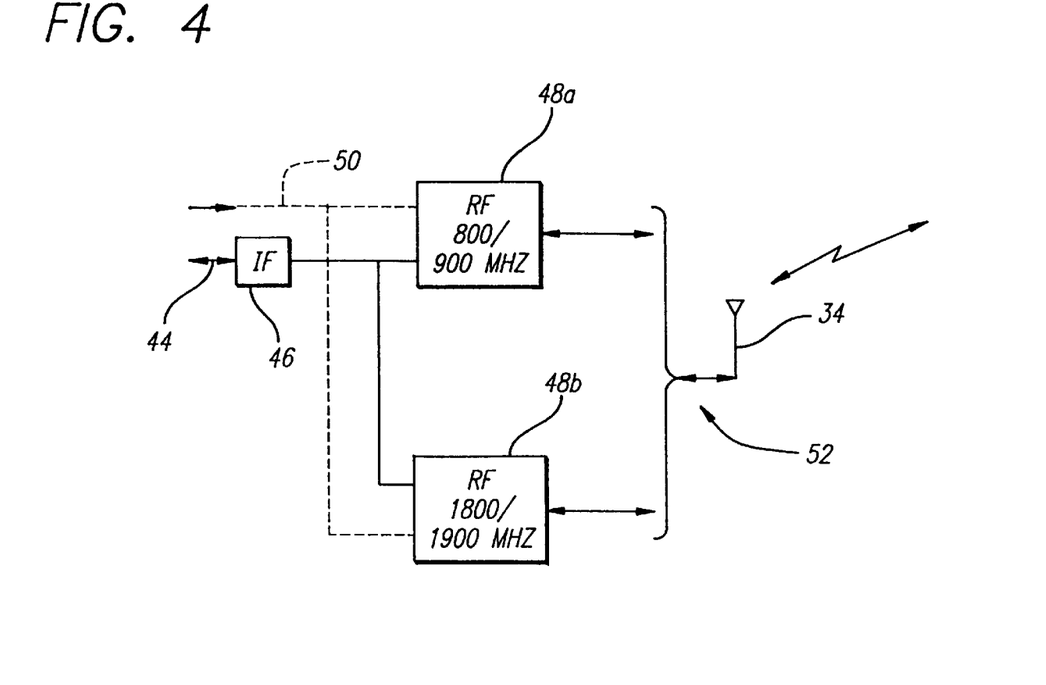
FIGS. 4 and 5 provide schematic functional block diagrams of parts of alternative embodiments of the present invention.
Figure 5:
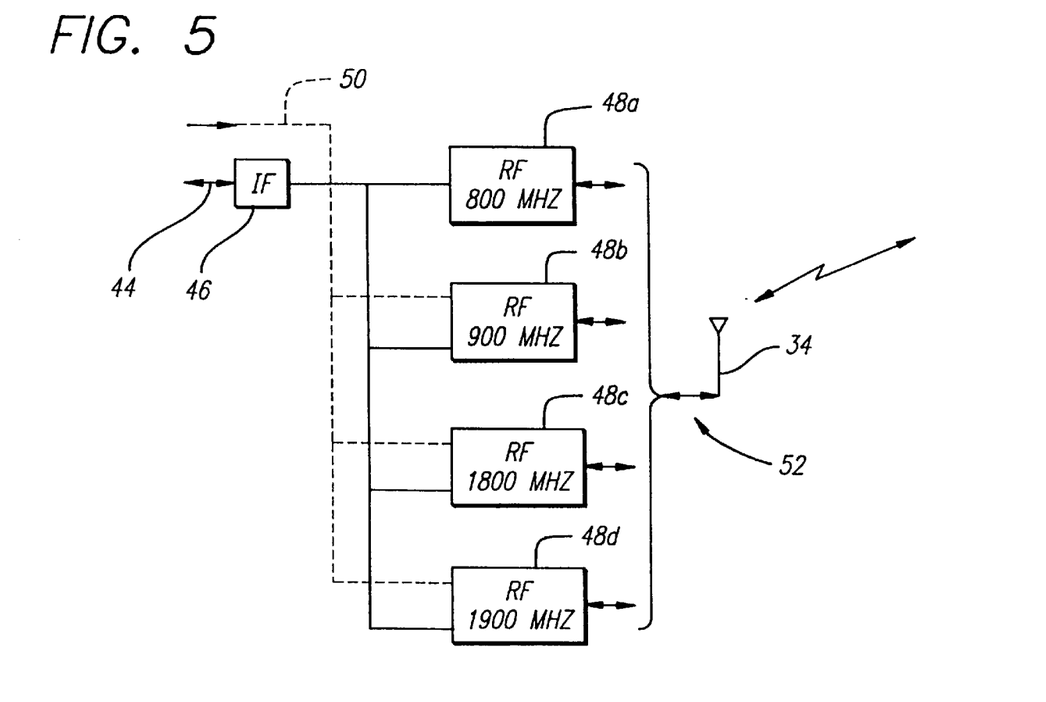

As will be seen, the chip 38 also has an interface (indicated on FIGS. 3, 4, and 5 with the arrowed numerals 44) with an antenna (such as antenna 34, recalling the description of FIG. 2), via an intermediate frequency circuit 46, and radio frequency circuits 48a, 48b seen in FIG. 4 (or 48a, 48b, 48c, and 48d, in the embodiment of FIG. 5). A control interconnection 50 (which will be further described below) is provided between the chip 38 and the various radio frequency sections seen in FIGS. 4 or 5. Arrowed numeral 52 seen in FIGS. 4 and 5 indicates radio-frequency connections between the RF circuit sections indicated and the antenna 34, or another antenna. Chip circuit 38 also has an interface (indicated by arrow 54) with an external memory facility 56. This external memory facility 56 may take the form of a flash-memory card, or of a SIMM card memory. Preferably, the memory 56 is removable from the cell-phone or portable personal communication device in order to allow additional communication protocols and other data to be programmed into the device.

Alternatively, the programming and storage of necessary data in the memory device 56 may be added to or changed via the interface with the cellular communication system 10 described with reference to FIG. 1. In this case, when a communication system protocol, for example, is needed in order for a cell-phone or PPCD to be functional in a particular cellular communication environment, it is downloaded from the system to the newly-arrived device. As soon as this downloading is completed, the device is operable in the particular cellular communication system environment. In the cases where such a downloading of data or programming information is necessary before a cell-phone, or PPCD, for example, is operative in a particular cellular communication environment, the user of the device may notice a delay after first turning the device on in the environment and it operability in this environment. This delay would be the only indication to a user of devices embodying the invention that the invention is present and operating. In other respects, the present invention is transparent to users of devices embodying the invention.

It will also be understood that a power source (such as a battery—not shown) and control interfaces (such as the switch hook control switch described above with reference to the cell-phone of FIG. 2) are provided in connection with circuit 38. Viewing the circuit architecture of FIG. 3, it is seen that the circuit chip 38 includes a micro-controller 58 (i.e., a programmable microprocessor) controlling operation of the chip 38 (and of the communication device 22). The micro-controller 58 and a digital signal processor (DSP) 60 have an interface (indicated at 64) with the external physical interface devices 42 via the interface connection 40. DSP 60 has associated with it a random access memory (RAM) facility 62. Micro-controller 58 also has an interface via a RAM 66 with the external memory 56, as is indicated by arrowed connection 68.

The micro-controller 58 and DSP 60 are communicated with one another via a communication bus 70, which also provides communication with respective bi-directional branches of a communication protocol adaptation tree 72 (i.e., a portion of the circuit 38). By bi-directional is meant that communication signals are passed in both directions along these adaptation tree branches. Dependent upon which format is being used, received communication signals are passed from right to left along the appropriate one of the branches 72a, 72b from the RF portion for decoding to human-intelligible speech. Conversely, speech communications from the user of the device 22 are passed from left to right along the appropriate one of these branches for conversion into the particular format being used in the cellular communication environment in which the device 22 is being used at a particular time. As will be seen, the micro-controller 58 can sample the communication environment by selective activation of the branches 72a and 72b, as well as by control of portions of the RF section 46, 48 to adapt the device 22 to the cellular communication environment.

For reasons of simplicity of illustration, the adaptation tree 72 is depicted as having only two branches 72a and 72b. The branch 72a handles communications in GSM protocol, while branch 72b handles communications in one of CDMA or TDMA protocols. Preferably, the branch 72b can handle either of these protocols in accord with a command from micro-controller 58. It will be apparent that an alternative architecture for the circuit chip 38 would be to provide a dedicated branch for each of the CDMA and TDMA protocols. Considering each of the branches 72a and 72b, it is seen that at the right-hand end of these branches, each includes a respective detector/analog-to-digital converter (ADC) 74a, 74b for receiving communications signals from the RF circuits 46 and 48 (a, b, c, d) seen in FIGS. 4 and 5. The converters 74 convert analog communication signals of a format corresponding to the communication system environment in which the device 22 is being used and received via the RF circuits to digital communication signals.

In the adaptation branch 72a, a Viterbi equalizer 76 receives the communication signals in digital format and passes them to a GSM cipher/decipher circuit portion 78. In the other direction of communication signal travel (i.e., in the direction of signals moving to the RF portion 46, 48 for transmission), the GSM cipher/decipher circuit portion 78 passes the signals via a GSM burst format converter 80 to a modulator digital-to-analog converter (DAC) 82 for conversion from digital form into analog form for handling in the RF section which is to be discussed in further detail below.

The GSM cipher/decipher circuit portion 78 passes communication signals with a GSM interleaving/de-interleaving circuit portion 84, which in turn passes communication signals with a GSM speech coder/decoder 86. The circuit portion 86 has an interface via buss 70 with the DSP 60 so that the latter circuit can assist in such digital signal processing chores as are required in the branch 72a. The DSP 60 passes the speech result of this process to and from the external interfaces 42 or receives such speech input from these interfaces (i.e., to or from the speaker 26 and microphone 28) after or for passage along the branch 72a when the communication device 22 is operating in GSM format.

Similarly, the branch 72b includes a CDMA/TDMA equalizer 88 which receives communication signals in the appropriate protocol in digital format from the detector/ analog-to-digital converter (ADC) 74b and passes them to a CDMA/TDMA cipher/decipher circuit portion 90. In the other direction of communication signal travel (i.e., in the direction of signals moving to the RF portion 46, 48 for transmission), the CDMA/TDMA equalizer 88 passes the signals to a modulator digital-to-analog converter (DAC) 92 for conversion from digital form into analog form for handling in the RF section which is to be discussed in further detail below.

The CDMA/TDMA cipher/decipher circuit portion 90 passes communication signals with a CDMA/TDMA interleaving/de-interleaving circuit portion 94, which in turn passes communication signals with a TDMA/CDMA speech coder/decoder 96. Again, the circuit portion 96 has an interface via bus 70 with the DSP 60 so that the latter circuit can assist in such digital signal processing chores as are required in the branch 72b. Again, the DSP 60 passes the speech result of this process to and from the external interfaces 42 or receives such speech input from these interfaces after or for passage along the branch 72b when the communication device 22 is operating in CDMA or TDMA protocol.

As is indicated by the dashed lines 98 and 98', the micro-controller 58 has a control interface with the DSP 60 and with the adaptation tree branches 72a, and 72b. It was pointed out above that the micro-controller 58 had a control interface 50 with the RF section 46, 48. The significance and use of these control interfaces will become more apparent in view of the following.

Now in order to appreciate how these control interfaces are used to adapt the device 22 to operate in various communication system environments, attention is directed to FIGS. 4 and 5. Viewing first FIG. 4, it is seen that one alternative for the RF sections 46, 48 is to have an intermediate frequency (IF) section 46 passing the communication signals in analog form with the appropriate branch 72a, 72b of the adaptation tree 72. This IF section passes the communication signals (at an intermediate frequency) with the appropriate one of two RF sections 48a, 48b. RF section 48a is a controllably adaptable 800 MHz or 900 MHz transceiver. Similarly, RF section 48b is a controllably adaptable 1800 MHz or 1900 MHz transceiver. The operating frequency of these transceiver sections is selected by the micro-controller 58 by control exercised over control interface 50, as will be further explained.

FIG. 5 depicts another alternative for the RF section 46, 48. In this alternative IF section 46 passing the communication signals in analog form with the appropriate branch 72a, 72b of the adaptation tree 72, and with the appropriate one of four RF sections 48a, 48b, 48c, and 48d. RF section 48a is a controllable 800 MHz transceiver, while RF section 48b is a controllable 900 MHz transceiver. Similarly, RF section 48c is a controllable 1800 MHz transceiver, while RF section 48d is a controllable 1900 MHz transceiver. Again, the one or more of these transceiver sections to be operable at a particular time is selected by the micro-controller 58 by control exercised over control interface 50, as will be further explained.

In view of the above, it can be seen that when the device 22 is operating in a cellular communication system environment to which it is already adapted, the micro-controller 58 simply exercises control via the control connections 50, 98, and 98' to operate the RF section at the appropriate frequency for the environment, as well as to operate the one of adaptation branches 72a or 72b (i.e., GSM protocol or one of CDMA or TDMA protocol) which applies in the environment. However, when the user of the device 22 takes it to another cellular communication system environment, when first turned on the device 22 will be inoperative just like a conventional cellular communication device which is incompatible with its operating environment. However, with the device 22, this inability to operate in not permanent as it is with a conventional cell-phone or other wireless communication device because the device 22 samples the environment and adapts itself to the cellular communication environment.

This environmental sampling takes place by the micro-controller selecting a first protocol for adaptation tree 72, then cycling the RF section through the available frequencies. A second and successive protocols are selected with the RF section being cycled through the available frequencies until the combination of communication protocol and operating frequency is arrived at to detect the cellular communication system set up instructions which are provide by the down-links of the system. Ordinarily, this sorting and selection process will take place so quickly when the device 22 is first turned on in a new cellular communication system environment that the user will not notice the adaptation of the device to its environment. Provided that the user has a service account that is recognizable to the local cellular communication service system, then the device 22 will simple provide cellular communication system access with the user not having to worry or take notice of the differing system environments.

Another advantage of the multi-frequency and multi-protocol capability of the device 22 can be realized in cellular communication system environments which may allow simultaneous access via more than one operating frequency band or more than one protocol. In this case, the user could use the device 22 to carry out simultaneous conference calls with several others, or to carry out simultaneous audio communication while a data transfer or video transfer is also taking place. This data or graphics file information transfer capability of the device will be understood in view of the disclosure of the co-pending application referenced above, and the following description of an alternative embodiment of the invention.

Figure 6:
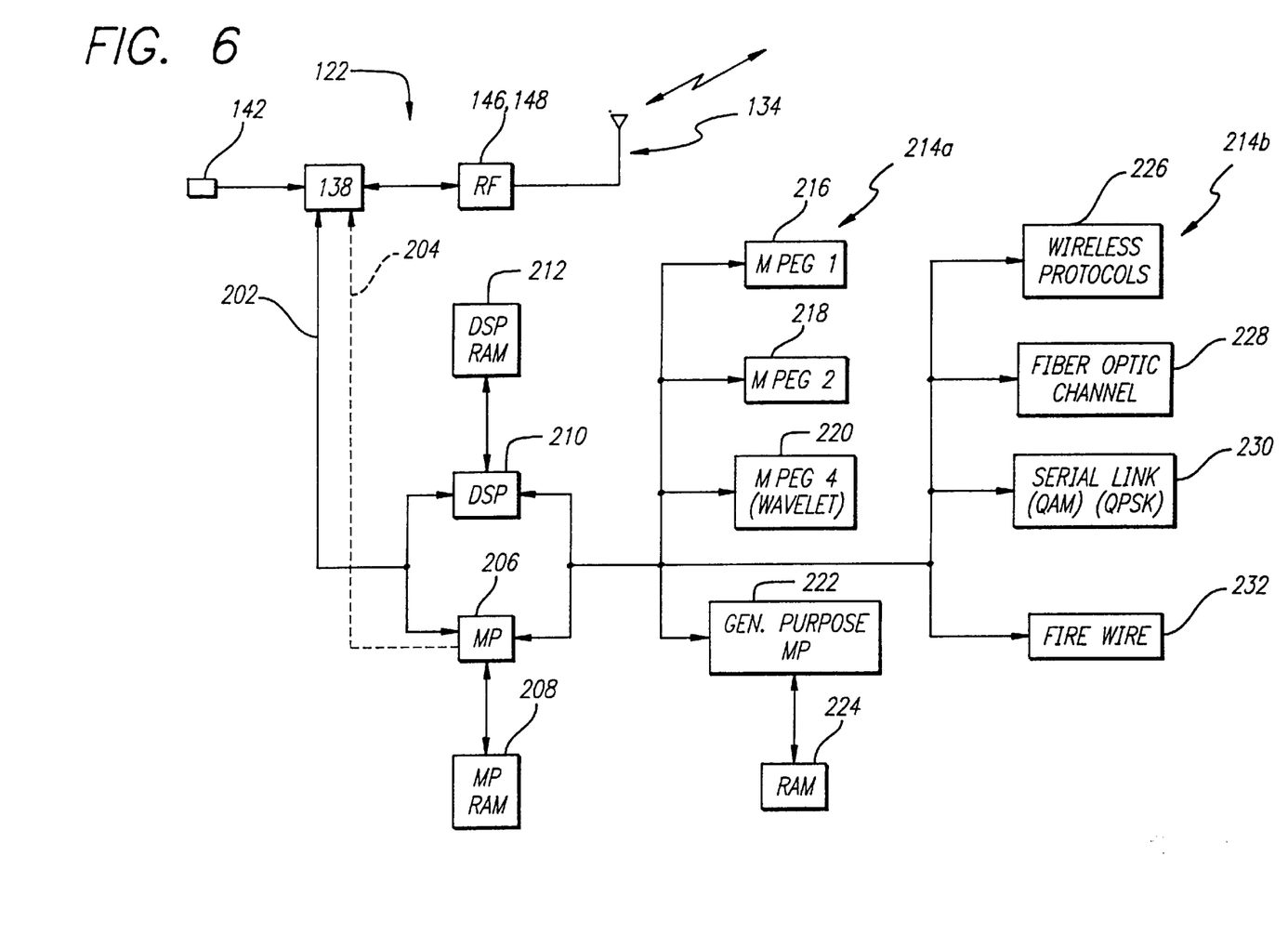
FIG. 6 provides a schematic functional block diagram of another alternative embodiment of the present invention.

Considering now FIG. 6, an alternative embodiment of the invention is depicted. In order to obtain reference numerals for use in describing this embodiment of the invention, features which are the same or which are analogous in structure or function to features depicted and described above are referenced with the same numeral used above, and increased by one-hundred (100). In addition to providing all of the cellular telephone functions and features described above, the embodiment of FIG. 6 provides a portable personal communication device which is able to send and receive a wide variety of communication signals, as will be seen. Viewing now FIG. 6, it is seen that the device 122 includes external physical interfaces 142, an integrated circuit chip 138, an RF section 146/148, and an antenna 134. Again, it is understood that a power supply (not shown) is provided to allow operation of the device. However, in this case, the chip 138 (or chip set) includes a portion (or separate chip of a chip set) which is indicated with the numeral 200. Preferably, the chip circuit portion 200 is a portion of the chip 138 (i.e., is formed on the same semiconductor material substrate) so that hereinafter, portion 200 is referred to as though it is understood that it is a part of chip 138. However, it will also be understood that in the case of the circuit 138 being configured as a chip set, the chip 38 may be a basic chip used in devices of basic capability, while the addition of the chip 200 provides a device of more advanced capability. This building block approach to adding capability of a communication device 22 (or 122) will be more fully understood after a consideration of a core architecture for the chips 38 and/or 138, which is discussed below.

It will be understood further that in addition to audio signals, video, graphics files, and data signals of various kinds can be transmitted in both directions over the airwaves as digital signals between the subscriber units 12 and base stations 14. It will further be understood that sources of communication signals for video, audio and data are not limited to other mobile and stationary subscriber units 12 in the system 10. Since the base stations 14 are linked to telephone networks, data can be provided over wired networks by sources such as private facsimile machines and corporate computers containing private or commercial databases. Audio can be provided over wired networks by analog telephones, personal computers and even radios. Video and graphics files can be provided by direct broadcast satellites and Very Small Aperture Terminals (VSAT), and by computers over fiber optic and ISDN networks. Internet and world wide web access via various ones of these connection possibilities make a great variety of communication signal sources and types available to the user of the device 122.

Accordingly, the circuit portion 138 provides the possibility for the device 122 to recognize and self adapt also to a wide variety of high speed communication signals formats and protocols, including present and future formats for video and graphics images, as well as high-speed data transmission. As is illustrated by arrowed numeral 202, the circuit portion 200 shares a signal communication connection with micro-controller 58 and DSP 60 (recalling the description above of chip 38). This connection is by interface with the buss 70. Also, arrowed numeral 204 indicates a shared connection with control interconnection 98/98'. As is initially depicted, the circuit portion 200 includes its own micro-controller 206 with micro-controller RAM 208, as well as its own DSP 210 with DSP RAM 212. It will be seen that these functions can be performed by a single micro-controller and DSP of sufficient capacity in a core architecture of the circuit 38. However, for purposes of description and understanding of the alternative embodiment depicted in FIG. 6, the micro-controller function and DSP function are considered to be resident in the circuit portions indicated with numerals 206 and 210, respectively.

The interface with circuit portion 138 allows circuit 200 to participate in sorting and recognizing various types, formats, and protocols of communication signals which may be received or transmitted by the device 122. As was the case with the audio communication protocols through which the device 22 sorts to achieve and adaptation to various cellular communication system environments, the device 122 can sort using the facilities explained below to identify and decode various video, graphics, data, and other present and future communication standards and formats. This self-adaptation of the device 122 allows it then to communicate in both directions using those signal types as may be present in the cellular wireless communication environment in which the user and device 122 find themselves.

Further considering FIG. 6, the circuit portion 200 includes a adaptation branch 214a which is primarily for graphics and video image communication signals, and an adaptation branch 214b which is primarily for high speed data transmissions. Viewing the adaptation branch 2214a, it is seen that this branch includes a circuit portion 216 for compression and decompression of image signals according to the motion picture experts group (MPEG) MPEG1 protocol. A circuit portion 218 allows compression/decompression of image signals according to MPEG2 protocol, while a portion 220 compresses and decompresses according to MPEG4 (which is also known as Wavelet). In order to provide for use of future protocols and standards as they come into use, the circuit portion 200 also includes a general purpose microprocessor portion 222 with RAM 224. This processor can be used to recognize, compress, and decompress signals according to future standards and protocols. Programming of the RAM to facilitate operation of the processor 222 can be effected by hard-wired interconnection of the device 122 to a programming computer system, or may be effected by the user receiving programming over the wireless communication link, either automatically when an unfamiliar protocol or standard is encountered in the wireless communication environment, or by the user using the PPCD to request that the protocol or standard be downloaded from the system.

Considering now the adaptation branch 214b, it is seen that this branch is provided with circuit portions for responding to various data transmission protocols and standards. A circuit portion 226 provides for compression and decompression, or coding and decoding, in wireless communication system data transfer protocols. Similarly, circuit portions 228, 230, and 232 provide for compression and decompression, or coding and decoding of data in fiber channel, serial link (i.e., QAM, QPSK), and Firewire protocols or standards, respectively.

In view of the above, it is seen that the device 122 can use the same frequency and protocol or standard sorting methodology explained above to identify and communication in various protocols and standards as are available in the wireless communication environment as it exists at the present and as it may exist in the future. The user of the PPCD 122 will be able to travel virtually throughout the world, while being able to access the wireless communication environment as it exists in the various geographic areas, and with a single device. That is, the contemporary requirement to purchase a number of cellular telephones or a number of PPCD's in order to achieve access to the wireless communication systems throughout the world is virtually eliminated by the present invention.

Figure 7:
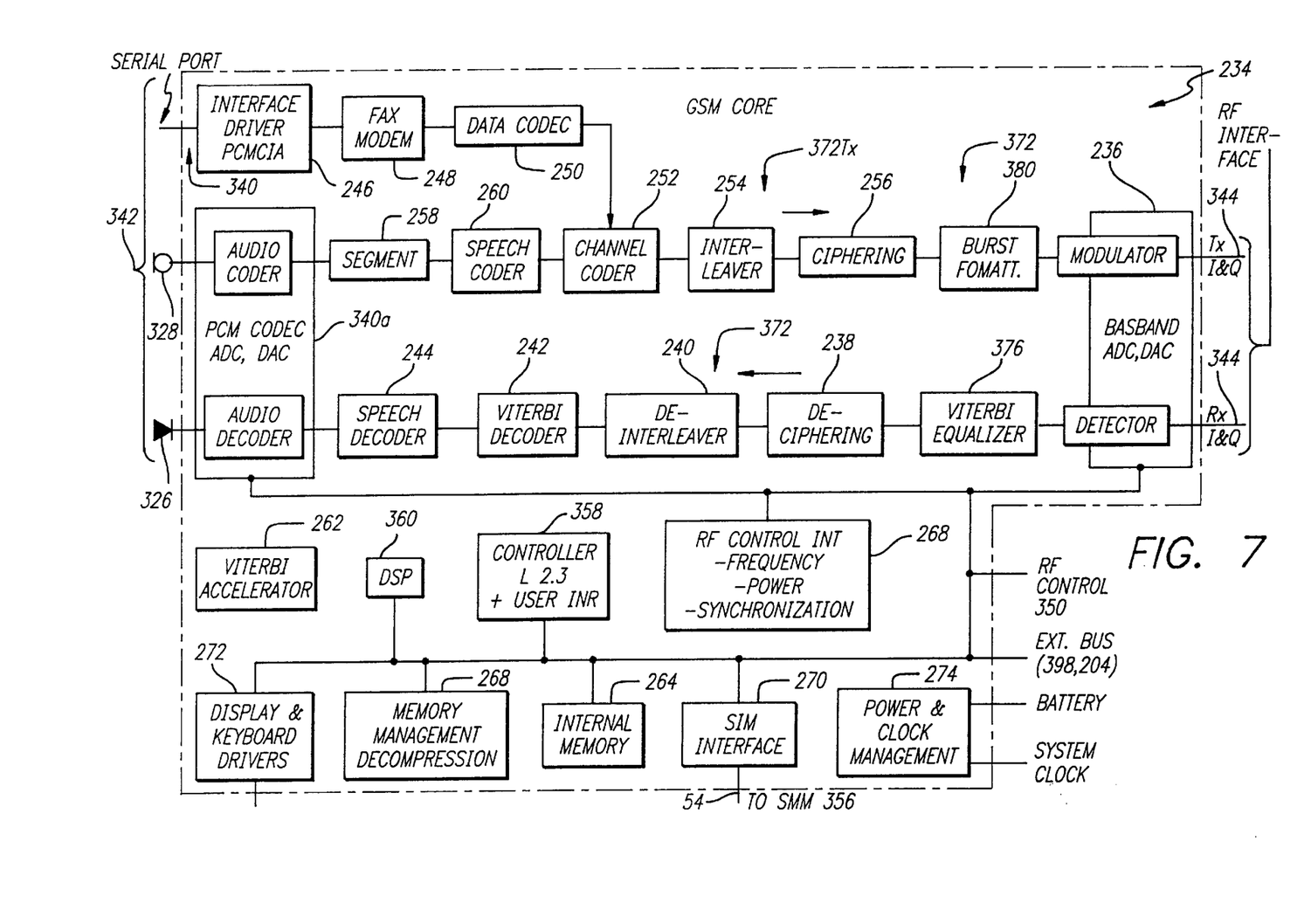
FIG. 7 provides a schematic functional block diagram of an architecture for a core circuit portion of a single-chip or chip-set product which may be used to implement the present invention.

Further, viewing now FIG. 7 a core circuit portion 234 for the circuits 38, and 138 is depicted. In order to obtain reference numerals for use in describing this portion of the invention, features which are the same as or which are analogous in structure or function to features depicted and described above are referenced with the same numeral used above, and increased by three-hundred (300) where necessary to prevent confusion by duplication of numerals from earlier drawing Figures and description. Reference numerals used in FIG. 6 are not so increased. It is seen viewing FIG. 7 that the core circuit portion 234 includes an interface 340 to the external physical interface devices 342. In this case, the interface devices 340 include a ADC,DAC device 340a for converting between analog signals to and from speaker 326 and microphone 328, and the digital signal processing facilities of the core circuit portion 234. Also, rather than having two or more two-way adaptation branches (72a, 72b) like the embodiment described above, the core circuit portion 234 includes a one-way signal-receiving adaptation branch 372Rx, and a one-way signal-transmitting adaptation branch 372Tx. The directions of signal travel in each of these adaptation branches is indicated by the arrow associated with each.

The branches 372 are able to be altered by control and participation of the micro-controller 358 and DSP 360

(along with other circuit portions to be described) to perform all of the various functions of the several two-way adaptation branches described above with respect to circuit portions 38, 138, and 200. At the RF interfaces, indicated with numerals 344), the core circuit portion 234 includes a base-band ADC/DAC converter, indicated with numeral 236 for providing conversion of analog signals from the RF section to digital signals, and for providing analog signals to the RF section from the core circuit portion 234. Considering the receiving adaptation branch 372Rx, it is seen to include a Viterbi equalizer 376, feeding communication signals to deciphering and de-interleaving circuit portions 238 and 240, respectively. The de-interleaved received communication signals are fed to a Viterbi decoder 242, and thence to a speech decoder 244. The physical interface 340a then provides analog speech signals to the speaker 326 based on the decoded digital speech signals provided by the decoder 246.

On the branch 372Tx, the core circuit portion 234 includes an interface driver 246 providing signals from such external physical interface devices as the keypad 30 and other inputs, to a fax/modem 248. A data codec 250 provides an interface into a channel coder 252. Downstream of the channel coder (that is, in the direction of signal movement in branch 372Tx, as is indicated by the associated arrow), the circuit portions 254, and 256, respectively for interleaving and ciphering, will be familiar from the description above of FIG. 3. In order to complete the connection between the microphone 328 and ADC portion of ADC/DAC 340a to the transmitter interface (i.e., at 344), a speech segmenter 258 and speech coder 260 are provided.

It is seen viewing FIG. 7 that the core circuit portion 234 includes a micro-controller 358 and DSP 360, which function in the capacity of controllers 58 and 206, and as DSP's 60 and 210. The DSP 360 is associated with a Viterbi accelerator 262. Also, an internal memory 264 fulfills the functions of memories 58, 60, 208, and 212 discussed above. A memory management and decompression circuit portion 266 assists in achieving this memory facility. In order to achieve the RF section control indicated earlier by control interface 50 (and indicated on FIG. 7 by numeral 350), the core circuit portion 234 includes an RF controller 268, which is effective to control interrupts to the power supplied to the RF sections (48a–d, for example), as well as to control frequency, power, and synchronization between the RF section and the cellular communication system (recalling the description above of uses of uplink and downlink frequencies to facilitate communication between the base stations and the subscriber units). In order to complete this description, it must be noted that core circuit portion 234 also includes a SIMM interface circuit 270 and a display and keyboard driver 272. A power and clock management interface 274 provides power and time management functions for the core circuit portion, and for associated circuit portions of a chip or chip set including the core portion 234.

In view of the description above of the building block principle of construction between the embodiment of FIGS. 3–5, and that of FIG. 6, it is easily seen that the core circuit portion 234 depicted in FIG. 7 provides a foundational structure upon which an adaptive wireless communication device can be built using the teachings brought out above in the context of the descriptions of FIGS. 3–6. The core circuit portion 234 is very efficient in terms of its device count and substrate area requirements, thus facilitating the formation of a single-chip product (most desirably), or of a chip-set product having an economical fabrication cost.

While the invention has been depicted and is described by reference to particularly preferred exemplary embodiments of the invention, such reference is not intended to imply a limitation on the invention, and no such limitation is to be inferred. Many modifications and alterations to the invention will suggest themselves to those ordinarily skilled in the pertinent arts. For example, it is apparent that the present invention could be implemented as part of an automotive communication and navigation system. Presently, automotive cellular telephones are well known. So to, automotive navigation systems which provide positional and map information to the operator of an automotive vehicle by use timed radio signal broadcasts from geosynchronous satellites are known. It should be well within the ordinary skill of the art to provide an integrated communication and navigation system using shared components and facilities in view of the disclosure of this application. Accordingly, the invention is intended to be limited only by the spirit and scope of the appended claims, given full cognizance of equivalents in structures and functions.

We claim:

1. A wireless communication device for allowing two-way voice communication in a cellular telephone communication system having at least one operating frequency band which at least one operating frequency band is one of several possible cellular telephone operating frequency bands, said device comprising:

operator voice input means and audio output means, respectively allowing an operator of said device to input voice communications and to hear voice communications from said cellular telephone communication system;

a radio frequency (RF) transceiver portion for sending and receiving RF signals carrying said two-way voice communications in said cellular communication system;

said RF transceiver portion having a first RF transceiver part having a respective first operating frequency band, and a second RF transceiver part having a respective second operating frequency band which is different than said first operating frequency band, one of said first and second operating frequency bands being compatible with said at least one operating frequency band of said cellular communication system;

a micro-controller interfacing with said RF transceiver portion of said device to alternatingly actuate said first transceiver part and said second transceiver part in order to detect when a signal is received from said cellular communication system in response to activation of one of said first and second RF transceiver parts, said micro-controller thereafter maintaining activation of said one transceiver part to adapt said wireless communication device for voice communication in said cellular telephone communication system;

said cellular communication system provides communication in a particular protocol, said device further including an adaptation tree circuit conveying communication signals in said device between said RF transceiver portion and said operator voice input means and audio output means, said adaptation tree circuit including at least two adaptation branches a first of which is adapted to process communication signals of a first protocol, and a second of which is adapted to process communication signals of a second protocol, said micro-controller interfacing also with said adaptation branches to detect when a communication signal is received from said cellular communication system and processed according to one of said first and second protocols in response to activation of one of said adaptation branches, said micro-controller thereafter maintaining activation of said one adaptation branch to adapt said wireless communication device for voice communication in said cellular telephone communication system; and said micro-controller further includes programming for performing a sorting-and-selection process including: selection of a first protocol for said adaptation tree, subsequently cycling said RF transceiver portion of said device through the available frequencies, and for responding to an intelligible signal; whereby a second and successive protocols are selected with the RF transceiver part each time being cycled through the available frequencies until the combination of communication protocol and operating frequency band provides said intelligible signal whereupon the particular combination of communication protocol and operating frequency band is maintained.

2. A wireless communication device for allowing two-way voice communication in a cellular telephone communication system operating in a plurality of predetermined operating frequency bands, said device comprising:

operator voice input means and audio output means, respectively allowing an operator of said device to input voice communications and to hear voice communications from said cellular telephone communications system;

a radio frequency (RF) transceiver portion for sending and receiving RF signals carrying said two-way voice communications in said cellular communication system;

said RF transceiver portion having a plurality of RF transceiver portions, comprising, a first RF transceiver portion having a predetermined first operating frequency band and operating under a first communication protocol, and a second RF transceiver portion having a predetermined second operating frequency band and operating under a second communication protocol, said first frequency different than said second frequency and said first communication protocol different than said second communication protocol;

said first and second RF transceiver portions formed of separate circuits, each forming first and second adaptation tree branches, said RF transceiver portion forming an adaptation tree circuit;

a controller portion operatively connected to said adaptation tree circuit, said controller cycling through said adaptation tree circuit until said controller portion arrives at a particular combination of frequency band and communication protocol such that said cellular communication device is operable for two-way communication;

a base station in said cellular telephone communication system, said base station able to transmit signals to said cellular communication device by transmission at a downlink frequency;

said base station having set up instructions for transmission at said downlink frequency to said cellular telecommunication device, to enable said cellular communication device to be operable with said base station;

said cellular communication device, when arriving at said particular combination of frequency band and communication protocol, is able to detect said set up instructions being transmitted by said base station on said downlink frequency;

a third RF transceiver portion having a predetermined third operating frequency band and operating under a third communication protocol, and a fourth RF transceiver portion having a predetermined fourth operating frequency band and operating under a fourth communication protocol, said third frequency different than said first, second and fourth frequencies;

said third and fourth RF transceiver portions formed of separate circuits, each forming third and fourth adaptation tree branches of said RF transceiver portion adaptation tree circuit; and said controller portion being operatively connected to said adaptation tree circuit, said controller cycling through said adaptation tree circuit until said controller portion arrives at a particular combination of frequency band and communication protocol such that said cellular communication device is operable for two-way communication.

3. The wireless communication device according to claim 2, wherein:

each of said RF transceiver portion tree branches of said RF transceiver portion adaptation tree circuit operates under a communication protocol that is a protocol selected from the group consisting of GSM, CDMA, IS-95, or TDMA.

4. The wireless communication device according to claim 2, wherein:

said first, second, third and fourth operating frequency bands are RF bands operating on a frequency band selected from the group of consisting of a 800 MHz band, a 900 MHz band, a 1800 MHz band or a 1900 MHz band.

* * * * *